United States Patent [19]

Pierce et al.

[11] Patent Number: 4,527,678
[45] Date of Patent: Jul. 9, 1985

[54] TRANSMISSION CLUTCH CONTROL SYSTEM AND METHOD

[75] Inventors: Stanley L. Pierce, Northville; Larry T. Brown, Westland; Pramod K. Jain, Canton, all of Mich.

[73] Assignee: Ford Motor Company, Dearborn, Mich.

[21] Appl. No.: 453,415

[22] Filed: Dec. 27, 1982

[51] Int. Cl.³ .................. F16D 21/02; F16D 43/28; F16D 43/30
[52] U.S. Cl. .................. 192/3.58; 192/0.092; 74/866
[58] Field of Search ............ 74/866, 752 A, 752 C; 192/0.032, 0.052, 0.092, 3.58, 48.9

[56] References Cited

U.S. PATENT DOCUMENTS

| 3,448,640 | 6/1967 | Nelson | 74/866 |
| 3,640,156 | 2/1972 | Mori et al. | 74/866 |
| 3,754,482 | 8/1973 | Sanders et al. | 74/752 A |
| 4,131,036 | 12/1978 | Ivey et al. | 74/866 |
| 4,361,060 | 11/1982 | Smyth | 74/866 |
| 4,428,467 | 1/1984 | Hiramatsu | 192/3.31 |

Primary Examiner—Rodney H. Bonck
Assistant Examiner—Alan G. Towner
Attorney, Agent, or Firm—Frank G. McKenzie; Donald J. Harrington

[57] ABSTRACT

A control system for transferring torque from a first, offgoing clutch to a second, oncoming clutch while a gear shift is being made includes speed sensors for determining the speeds of the engine shaft and the output shaft of the transmission, a gear selector position indicator, a throttle position indicator and a gear ratio sensor. Solenoid operated valves open and close a source of high pressure fluid to the clutches, whose engagement and disengagement holds the gear elements of the transmission by means of which the various speed ratios are produced. An electronic computer is supplied with the digital equivalent of the shaft speeds, the position of the gear selector and of the throttle. The engine speed-output shaft speed ratio is used as a feedback signal on the basis of which an error between its value and a commanded value is determined. An equation for determining the duty cycle is repetitively calculated and its value converted to a pulse width modulated electrical current that is applied to the solenoid windings. The equation corrects a previously calculated duty cycle with the feedback error value.

12 Claims, 6 Drawing Figures

TRANSMISSION CLUTCH CONTROL SYSTEM AND METHOD

BACKGROUND OF THE INVENTION

Field of the Invention

The present invention relates to a control system for an automatic transmission. More particularly, this invention pertains to a system that controls the disengagement of one clutch and a concurrent engagement of a second clutch during a gear ratio change.

SUMMARY OF THE INVENTION

The system according to this invention concurrently disengages a first, offgoing clutch, and engages another, ongoing clutch, of an automatic transmission when a gear ratio change is made. The control system can be used either to make an upshift or a downshift either with power or without power. The system is particularly useful in maintaining the sum of the torque in the ongoing and offgoing elements at a constant value.

The system includes first and second hydraulically actuated clutches which may be disk or cone clutches, a disk brake or a servo brake band. A source of regulated pressurized fluid usually available in an automatic transmission hydraulic system is applied to the inlet of clutch actuator valves associated with each clutch. Each electrical solenoid moves an element within the valve in response to an electrical current applied to its winding by means of which the source of pressurized fluid is connected to the clutch cylinder or the cylinder is vented. A pulse width modulated current is applied to the solenoid winding after converting a duty cycle calculated or otherwise produced at frequent intervals by a microprocessor. The speed of the engine shaft and of the transmission output shaft are continuously monitored and applied as input to the microprocessor within which a ratio of these speeds is repetitively calculated. The position of the gear selector, the position of the engine throttle and the gear ratio in which the transmission is currently operating are also applied as input to the microprocessor.

When a gear ratio change is required, for example, when the ratio change is a power-on upshift, the pressure of the offgoing clutch is decreased, which causes an increase within limits in the engine speed output shaft speed ratio, but removes excess torque capacity of the offgoing clutch. The pressure of the offgoing clutch is modulated according to the repetitively calculated duty cycle value in order to maintain the speed ratio within an acceptable limit.

Concurrently, the pressure of the ongoing clutch is increased by first filling the oncoming clutch cylinder and bringing its friction elements into contact without transmitting torque through the clutch. When this action is completed, as usually measured by the time required to complete this action, the duty cycle of the ongoing clutch and its torque capacity are increased linearly by increasing the duty cycle after each execution of the pressure modulation subroutine. As the torque capacity of the ongoing element increases, torque is gradually lifted from the offgoing element. Finally when the speed ratio declines below the value required to maintain the original gear ratio, the control system senses that further reductions of the pressure in the offgoing clutch element will not maintain the speed ratio. At this point the clutch engagement-disengagement subroutine is no longer executed.

DESCRIPTION OF THE PREFERRED EMBODIMENT

Figure 1:
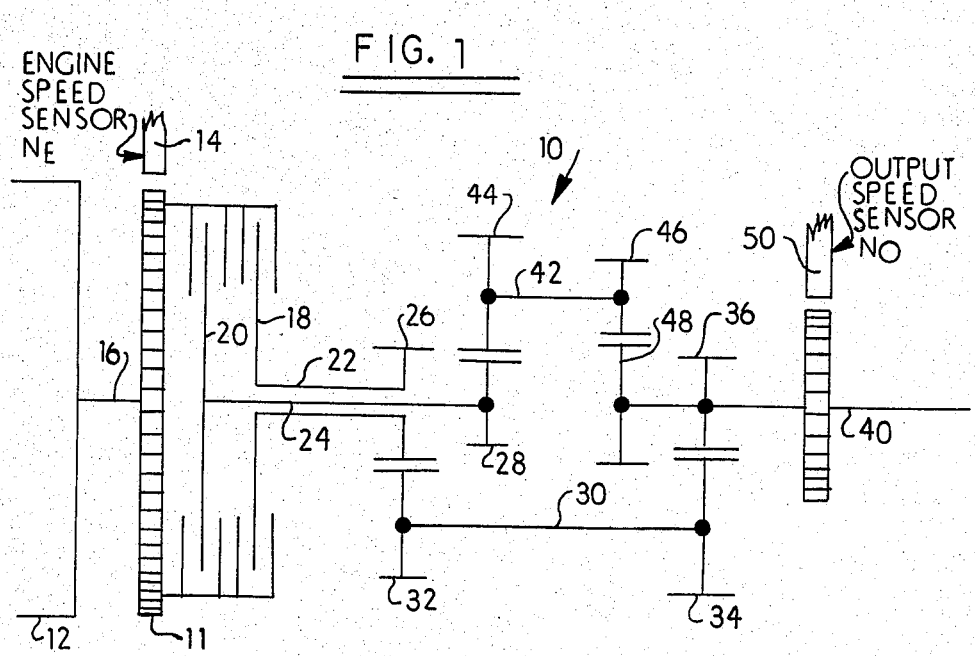
FIG. 1 is a schematic diagram of the gearing and clutch arrangement of an automatic transmission controlled by the action of the control system according to this invention.

An automatic transmission that may be controlled through operation of the control system according to this invention is shown in FIG. 1. The flywheel 10 of an engine carries on its outer perimeter gear teeth that are engaged by a starting motor. The teeth pass under a variable reluctance speed sensor 14 in which is produced an electrical signal representative of the speed of the engine shaft 16. Two hydraulically actuated start-up clutches 18, 20 driveably connect the engine to input shafts 22, 24, which carry input gears 26, 28 that are fixed to the input shafts. A first countershaft 30 has an input pinion 32 meshing with input gear 26 and an output pinion 36 meshing with output gear 38, which is fixed to the output shaft 40 of the transmission. A second countershaft 42 has an input pinion 44 meshing with a second input gear 28 and an output pinion 46 meshing with output gear 48, which is fixed to the output shaft 40. A second variable reluctance tachometer 50 produces an electrical signal whose frequency varies with the speed of shaft 40.

Power is transmitted from the engine shaft to the output shaft at different speed ratios, NE/NO, depending upon whether clutch 18 or clutch 20 is engaged. When a speed ratio change is made, the engaged clutch is disengaged concurrently with the engagement of the disengaged clutch.

Figure 2:
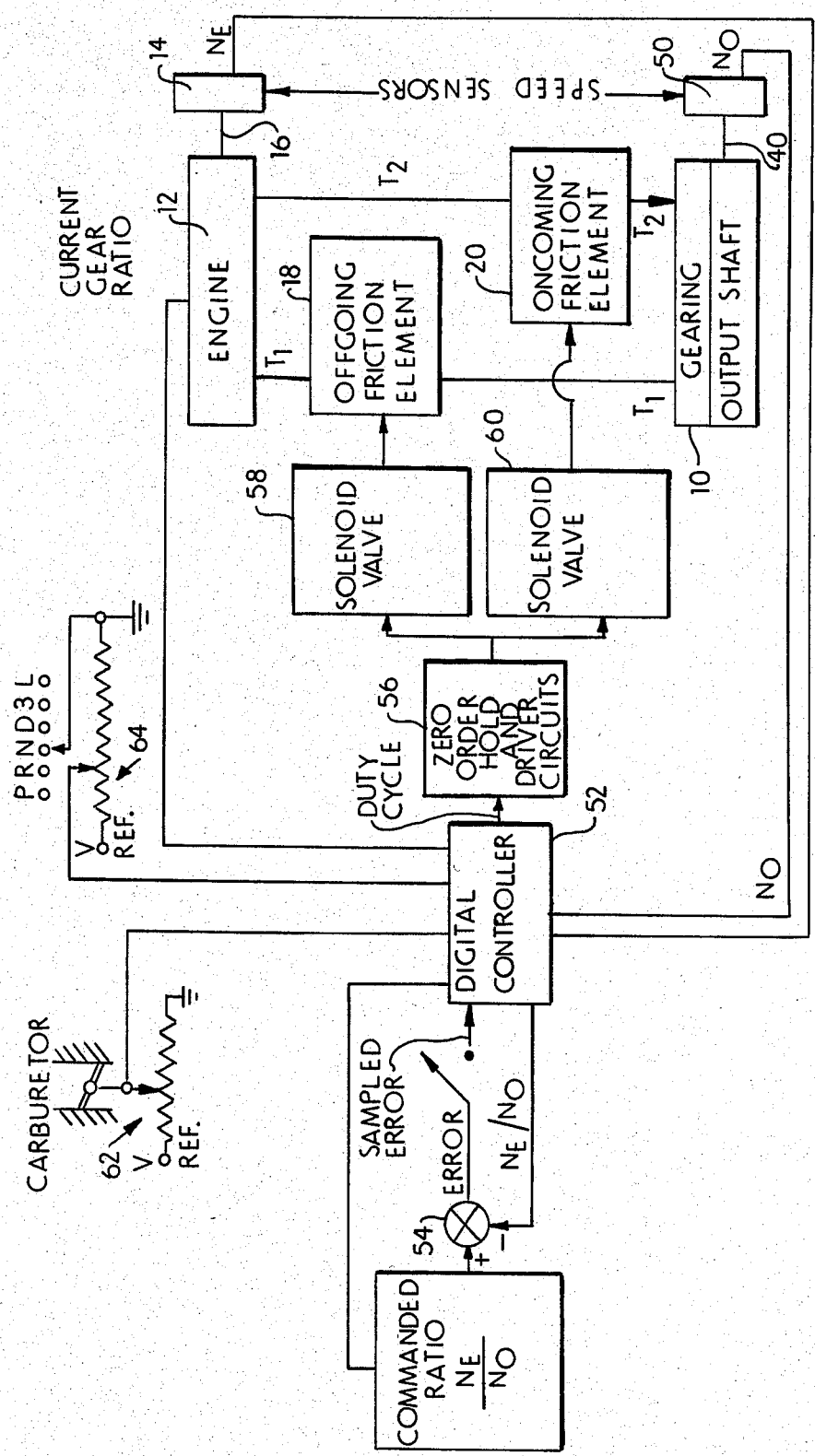
FIG. 2 is a diagram showing the various sensors, the control system and the transmission operation controlled by this invention.

Referring now to FIG. 2, the control system according to this invention includes a digital controller 52, such as a microprocessor or computer, which receives the output from the speed sensors 14, 50 and other driveline sensors and issues, on the basis of programmed logic accessible to the controller, periodic to an error speed ratios, NE/NO, which are applied to an error detector 54. The controller also applies as an input to the sensor the actual ratio, NE/NO, derived from the output of the speed sensors 14, 50. The detector 54 issues an error signal which is the difference between the actual speed ratio and the commanded speed ratio. The error signal is sampled periodically and applied as input to the controller which determines whether a gear shift is required or whether the driveline is operating in an acceptable speed ratio. If a speed ratio change is required, a duty cycle is calculated in the microprocessor according to a programmed algorithm stored in a data base that is accessible to the microprocessor. The controller processes the error at each sampling instant and the previous sampled error values during the process of calculating the duty cycle. The magnitude of the duty cycle determines, through the action of digital to analog conversion circuits and driver circuits, the magnitude and duration of pulse width modulated signals applied to the solenoid windings of hydraulic actuator valves 58, 60. A system suitable for converting the duty cycle values to an electrical current is described in U.S. patent application Ser. No. 393,208, filed June 28, 1982, the entire disclosure of which is made a part hereof by reference. Valve 58 pressurizes and vents clutch 18, which is arbitrarily chosen as the friction clutch that is engaged and becomes disengaged through operation of this control system, and valve 60 pressurizes and vents clutch 20, which has been arbitrarily chosen as the disengaged clutch that becomes engaged through operation of this system. These clutches will be referred to as the offgoing and oncoming friction elements, respectively. During the period wherein the clutches are pressurized and vented, the duty cycle is repetitively calculated so that pressure to the offgoing element is modulated in accordance with the pulse width modulated signal applied to the winding of the asociated solenoid valve.

Figure 4:
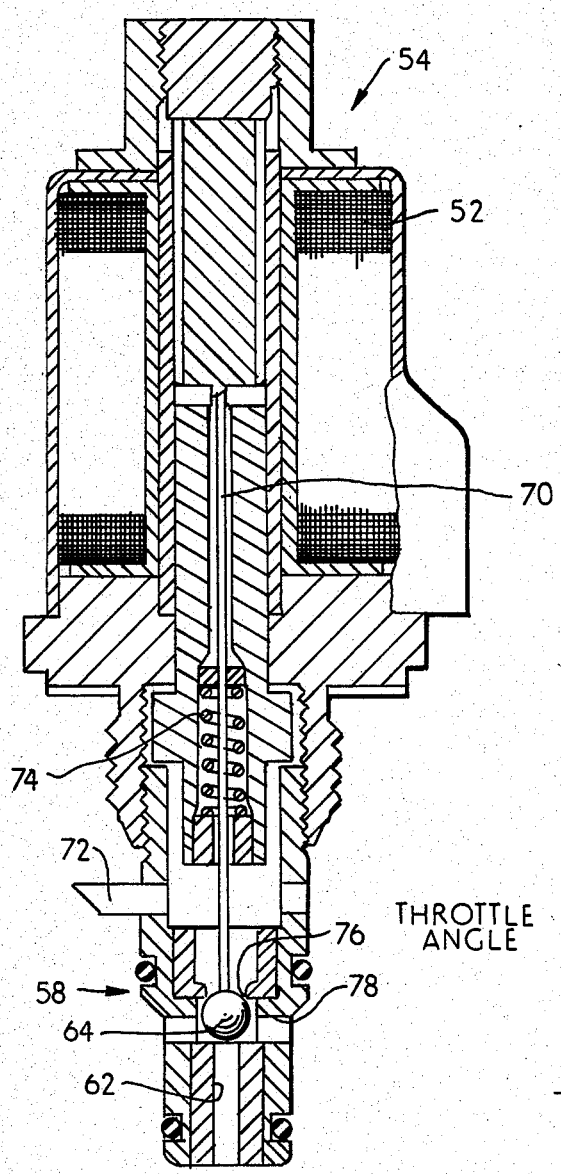
FIG. 4 is a cross section through the solenoid-operated clutch actuator valve.

FIG. 4 shows a normally open, solenoid-operated actuator valve 62 that may be used to modulate pressure to either of the clutches 18, 20. Line pressure, which is regulated between maximum and minimum limits by the line pressure regulating system of the hydraulic circuit, is applied to the inlet 62. The valve has a ball element 64 that is moved downward into a seated position on the inlet 62. When the winding of the solenoid is energized, the force produced moves the plunger 70 downward and holds the ball element in a seated position on the inlet thereby opening communication between outlet port 78 and vent port 72. When the windings 52 are de-energized, plunger 70 is biased upward by the force of compression spring 74 and ball element 64 is moved by the force of line pressure applied at inlet 62 to move the ball element upward into a seated position on orifice 76. When the winding is de-energized, hydraulic fluid at line pressure is applied to the actuating cylinder of clutch 18 through outlet 78 and vent port 72 is closed to the inlet 62 and to the outlet 78.

Figure 5:
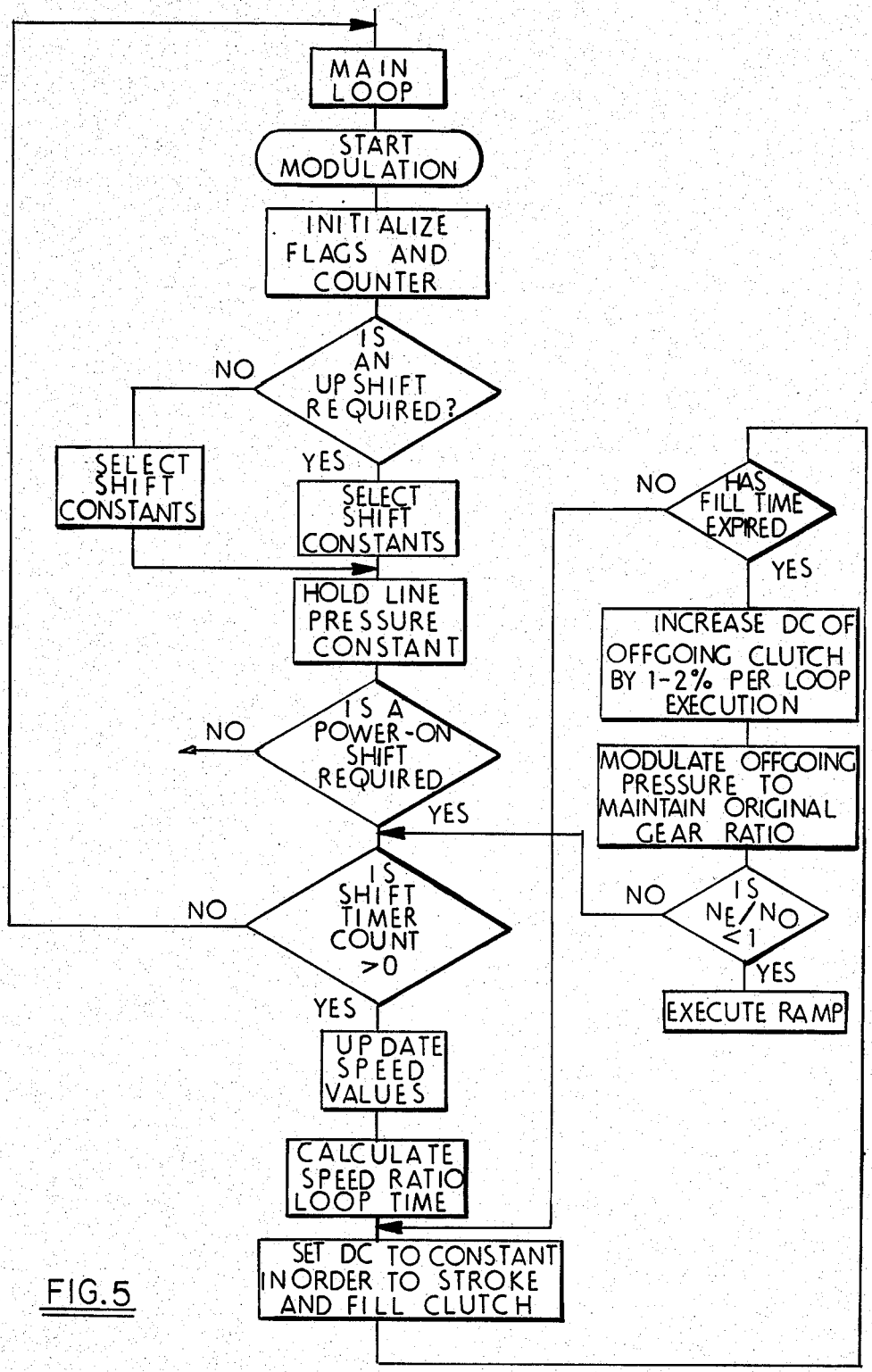
FIG. 5 is a logic flow diagram on the basis of which the control system computer program is coded.

The logic flow diagram on the basis of which the microprocessor controls clutch pressure to the ongoing and offgoing elements is shown in FIG. 5. A main control loop, which is executed repetitively, is used to calculate engine speed, NE, and output shaft speed, NO, from the signals produced by speed sensors 14, 50. The throttle angle position is determined from the throttle angle sensor, the selected operating mode of the transmission is determined from the PRNDL sensor position, and the current speed ratio is determined from the state of the actuator valves and the speed reduction associated with the intermeshing gear train through which power is transmitted. From this information, a decision is made through the use of the main loop algorithm as to whether an upshift or downshift is required upon reference to data stored in memory that relates desired combined values of output shaft speed, throttle angle engine speed, gear ratio and vehicle speed. If the desired gear ratio is the same as the current ratio, the main program loop is repeated; otherwise the modulation subroutine is invoked, by means of which the gear shift logic is executed. In the process of executing the modulation subroutine, first the microprocessor flags and counters are initialized. Next, a determination is made whether an upshift is required. On the basis of this decision, the appropriate constants for the desired shift are selected. These constants include the slip time, gain constants, level mode tolerances, the ongoing and offgoing lower and higher saturation limits of the duty cycles to be calculated, etc.

Figure 6:
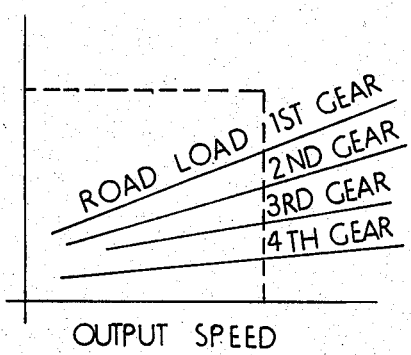
FIG. 6 is a graph showing data to which reference is made in the course of execution of the computer program.

Next, the line pressure regulator solenoid is controlled so that line pressure applied to the actuator valve at inlet 62 is held constant. A determination is then made whether the required shift is a power-on or power-off shift. This result is determined with reference to the data presented in FIG. 6, which is stored in memory that is accessible to the microprocessor, and the actual throttle angle. The actual throttle angle is compared to the road load throttle angle derived from the current output shaft speed and the current gear ratio in which the transmission is operating. If the actual throttle angle is greater than the road load throttle angle, a power-on shift is initiated; otherwise a power-off shift is made. After the shift type is determined, the appropriate shift strategy is initiated, but only the shift strategy applicable to power-on shifting will be described.

In the process of executing the algorithm that controls a shift from a lower speed ratio to a higher speed ratio, a subroutine, which will be described next, is repeatedly executed. The microprocessor has an interval timer by means of which the maximum number of executions of the subroutine or elapsed time is determined; the count is compared to a predetermined number of executions of the loop. The first step in the execution of the subroutine includes an inquiry as to whether the shift timer count is greater than zero. If the shift timer count is greater than zero, it is decremented; otherwise the subroutine execution is terminated and the program is returned to the main loop. If the clutch pressure modulation subroutine is to continue, the values of the several speed sensors are updated; the speed ratios, loop time and ramp time are calculated. An electrical pulse width modulated current is applied to the winding of the oncoming actuator valve solenoid on the basis of a constant duty cycle value or several different constant such values. Alternatively, the duty cycle for this solenoid may be steadily increased a predetermined amount each time the subroutine is executed. The hydraulic pressure of the other clutch is repetitively calculated and converted to a pulse width modulated current flowing through the winding of the offgoing clutch. By this means torque is transferred from the offgoing clutch to the oncoming clutch in accordance with the control strategy of this invention. Next, a determination is made as to whether the shift is completed by referring to the data presented in FIG. 3. If the shift is completed, the microprocessor flags are reset and a jump is made to the main program loop. If the shift is not completed, control is returned to the loop of the shift modulation subroutine and the loop is executed again.

Figure 3:
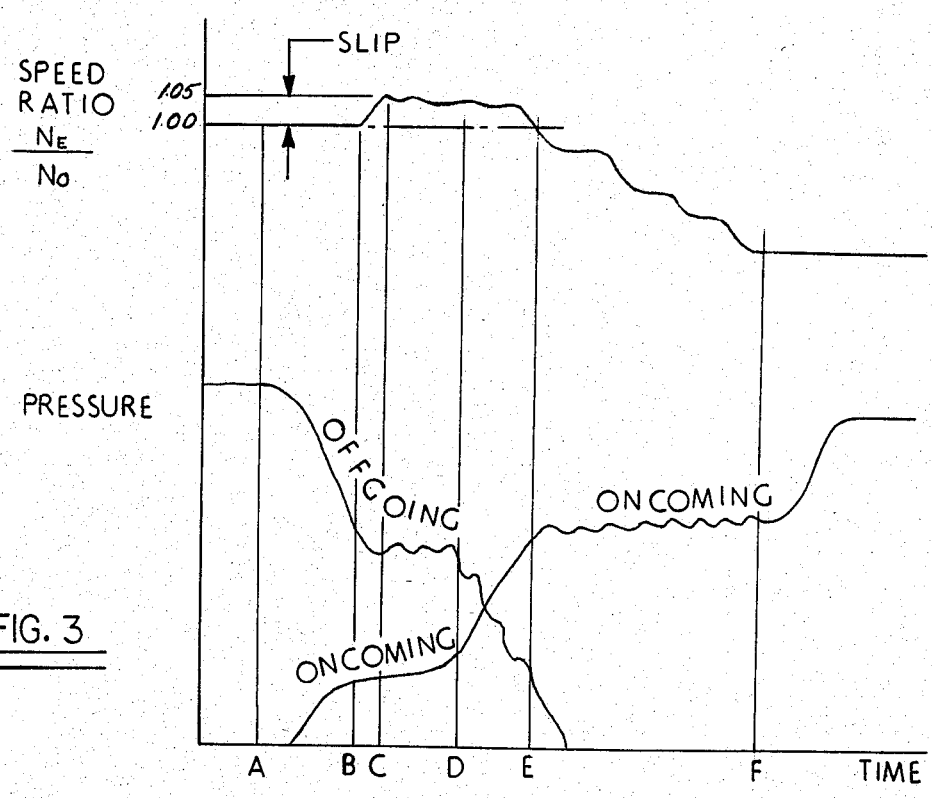
FIG. 3 is a graph showing variation in the hydraulic pressure of the offgoing and oncoming clutches and changes in the speed ratio plotted on the common time scale.

An upshift begins by decreasing the pressure in the offgoing friction element, an action which at first merely reduces the capacity of the clutch to transmit torque in excess of the torque actually transmitted through the clutch; therefore, no change in rotational speed of the engine or output shaft results. This pressure decrease results because a constant duty cycle for the offgoing clutch is set so that the clutch is vented by action of the pulse width modulated signal. Time A in FIG. 3 indicates the beginning of the pressure reduction in the offgoing clutch. In FIG. 3, the NE/NO ratio value is shown arbitrarily as unity for the original gear ratio from which the shift is to be made. However, as pressure continues to reduce, a point is reached at time B where the offgoing clutch slips, allowing engine speed to rise and the speed ratio NE/NO to increase. The microprocessor calculates, at frequent intervals, approximately every 10 msec., a new current duty cycle for the offgoing clutch repetitively during the period following clutch slip until NE/NO falls below 1.0, according to the following relationship:

$$DC_c = DC_p + E_c^* K_i + (E_c - E_p)^* K_d + E_c^* K_p$$

where

DC$_c$ is the current duty cycle;

DC$_p$ is the previously calculated duty cycle;

E$_c$ is the current error, i.e., the difference between the NE/NO ratio corresponding to the current gear ratio and the actual ratio;

E$_p$ is the previous error value; and

K$_i$, K$_d$, K$_p$ are the integral gain, differential gain, and proportional gain of the system.

Accordingly, as the NE/NO ratio increases, the clutch pressure increases to bring the ratio within the acceptable range.

The control system applies less pressure to the offgoing clutch, thereby reducing the slip and maintaining the speed ratio at the upper end of the permissible tolerance. Pressure to the clutch is modulated and regulated in order to place the clutch in readiness to release immediately without having any excess capacity that must be removed. Any drop in the speed ratio for any reason causes clutch pressure to diminish and allows the engine speed and the NE/NO ratio to rise.

Concurrently with the modulation of the offgoing clutch, the duty cycle of the ungoing clutch is set at a constant value near 100% in the time period between A and B, during which the clutch cylinder is filled with fluid. This duty cycle is lowered to a constant value after the cylinder is filled during the period between B and D, which causes the clutch piston to move against the return springs without generating appreciable torque capacity in the ongoing clutch. At the time D the friction plates of the ongoing clutch are in contact. During the period between D and E the duty cycle of the ongoing clutch is increased between 1 and 2% of its previous value each time the modulation loop is executed. During the period between D and E the torque capacity of the ongoing clutch element increases as its pressure rises and torque is lifted from the offgoing clutch. The control system attempts to maintain the NE/NO speed ratio with approximately 5% slip, however, as the ongoing clutch torque capacity increases, the NE/NO speed ratio falls and eventually declines below 1.0. Due to the operation of the control system that modulates the pressure in the offgoing clutch, this drop in the NE/NO ratio causes a drop in the pressure to the offgoing clutch and its torque capacity declines concurrently with the increased torque capacity of the ongoing clutch. The control system senses that the offgoing clutch can no longer maintain the NE/NO speed ratio by reducing pressure to the offgoing clutch. At time E all of the torque is transmitted through the ongoing clutch and none of the torque is transmitted through the offgoing clutch. When this condition occurs, the clutch modulation subroutine is no longer executed and torque transfer is concluded.

After time E the oncoming clutch pressure is regulated through repetitive calculation and corrections made to its duty cycle so that engine speed is decreased to a predetermined rate and the NE/NO ratio reaches the value that is consistent with the gear ratio to which the transmission is shifted. At the time F, the duty cycle of the oncoming clutch is 100% and the speed ratio is maintained constant.

Having described a preferred embodiment of our invention, what we claim and desire to secure by U.S. Letters Patent is:

1. A system for transferring torque from one clutch to another clutch in an automotive automatic transmission during the process of changing from an original gear ratio to another gear ratio comprising:

first and second hydraulically actuated clutches;

a sensor which generates a signal that represents the transmission output shaft speed, NO;

a source of pressurized fluid;

an engine shaft sensor which generates a signal that represents the engine rotational speed, NE;

first and second solenoid-operated actuator valves connected to the pressurized fluid source and to the clutches for pressurizing the clutches from the source and for venting the clutches as the solenoid windings are energized and de-energized;

controller means provided with a data base that includes the values of integral gain, K$_i$, derivative gain, K$_d$, proportional gain, K$_p$, commanded NE/NO ratio corresponding to the gear ratio from which a gear shift is made, and current actual NE/NO ratio, adapted to calculate, to store in memory and to recall from memory the current error, E$_c$, and previous error, E$_p$, each error representing the difference between the commanded NE/NO ratio and the actual NE/NO ratio, and for repetitively calculating current duty cycle values, DC$_c$, for the first clutch solenoid from the relationship:

$$DC_c = DC_p + E_c^* K_i + (E_c - E_p)^* K_d + K_d + E_c^* K_p$$

where.DC$_p$ is the previous duty cycle for the first clutch solenoid;

the controller means being adapted to produce a duty cycle for the second clutch solenoid that increases its clutch pressure while the first clutch solenoid is controlled in accordance with the current duty cycle value; and means for converting the current duty cycle of the first clutch and the duty cycle of the second clutch to an electrical current applied to the respective solenoid windings whereby the torque capacity of the first clutch declines and that of the second clutch increases.

2. The system of claim 1 wherein the sum of the torque transmitted by the first and second clutches is constant.

3. The system of claim 1 wherein the solenoid-operated valves comprise:

an inlet port communicating with the pressure source, an outlet port communicating with the clutch and a vent port;

a valve member movable between a first state where the inlet port is closed and the vent port is connected to the clutch and a second state where the inlet port is connected to the clutch and the vent port is closed;

means biasing the valve member to the second state if the solenoid is de-energized, and means for moving the valve member to the first state if the solenoid is energized.

4. The control system of claim 2 wherein the solenoid valve comprises:

means biasing the valve member to the first state if the solenoid is de-energized; and means for moving the valve member to the second state if the solenoid is energized.

5. The control system of claim 1 further comprising means producing a pulse width modulated signal from the duty cycle of the solenoids of the first and second actuator valves.

6. The control system of claim 1 wherein the gear shift is made from a low speed ratio to a higher speed ratio.

7. A method for controlling, with the aid of a computer having a data base whose contents are accessible to the computer, the transfer of torque from a first clutch to a second clutch in an automatic transmission having speed sensors for indicating the speed of the engine, NE, and of the transmission output shaft, NO, and first and second solenoid-operated actuator valves through which the clutches are pressurized and vented comprising:

storing in the data base integral gain, $K_i$, derivative, gain, $K_d$, proportional gain, $K_p$, and commanded NE/NO ratios corresponding to the gear ratios of the transmission;

determining the error as the difference between the commanded NE/NO ratio and the current actual NE/NO ratio and storing the error value in the computer memory;

calculating at frequent intervals the current duty cycle value, $DC_c$, for the first clutch solenoid from the relationship:

$$DC_c = DC_p + E_c * K_i + (E_c - E_p) * K_d + E_c * K_p$$

wherein $DC_p$ is a duty cycle for the first clutch solenoid calculated using this equation during a previous interval, $E_c$ is the current error, and $E_p$ is an error determined during a previous interval;

producing a duty cycle for the second clutch solenoid which increases in magnitude over the period during which $DC_c$ is being periodically calculated;

converting $DC_c$ and the duty cycle for the second clutch solenoid to electrical currents that are applied to the windings of the first and second clutch solenoids, respectively; and pressurizing and venting the first and second clutches in accordance with the duty cycle values.

8. The method of claim 7 further comprising producing, before $DC_c$ is used to control operation of the first clutch, a duty cycle for the first clutch solenoid whose effect reduces the torque capacity of the first clutch but maintains the NE/NO ratio within acceptable limits of the NE/NO ratio that corresponds to the original transmission gear ratio; and converting said duty cycle to an electrical current applied to the winding of the first clutch solenoid.

9. The method of claim 8 further comprising:

producing a duty cycle for the second clutch solenoid whose effect fills the second clutch and brings the torque transmitting elements of the clutch into contact but without developing substantial torque capacity in the second clutch; and converting said duty cycle to an electrical current applied to the winding of the second clutch solenoid.

10. The method of claim 7 further comprising:

producing a duty cycle for the second clutch solenoid whose effect fills the second clutch and brings the torque transmitting elements of the clutch into contact but without developing substantial torque capacity in the second clutch; and converting said duty cycle to an electrical current applied to the winding of the second clutch solenoid.

11. The method of claim 7 wherein the duty cycle of the second clutch solenoid increases linearly while $DC_c$ is being periodically calculated.

12. The method of claim 7 wherein the duty cycle of the second clutch solenoid increases by a constant percentage of its value at the previous interval while $DC_c$ is being periodically calculated.

* * * * *